United States Patent [19]

Urso

[11] Patent Number: 4,577,807
[45] Date of Patent: Mar. 25, 1986

[54] OPEN FACE ROTATABLE SPOOL FISHING REEL

[76] Inventor: Charles L. Urso, 215 Newton St., Waltham, Mass. 02154

[21] Appl. No.: 736,424

[22] Filed: May 20, 1985

Related U.S. Application Data

[63] Continuation-in-part of Ser. No. 558,821, Dec. 7, 1983, abandoned.

[51] Int. Cl.$^4$ .................... A01K 89/015; A01K 89/04
[52] U.S. Cl. ........................ 242/84.2 C; 242/84.2 G; 242/84.21 R; 242/84.41
[58] Field of Search ............. 242/84.21 R, 84.26, 242/84.2 D, 84.2 C, 84.41

[56] References Cited

U.S. PATENT DOCUMENTS

| | | | |
|---|---|---|---|
| 2,613,882 | 10/1952 | Small | 242/84.21 R |
| 2,732,147 | 1/1956 | Rotter | 242/84.21 R |
| 2,753,130 | 7/1956 | Sjögren | 242/84.21 R |
| 3,727,857 | 4/1973 | Chann | 242/84.41 X |
| 4,005,832 | 2/1977 | Yamazaki | 242/84.21 R |
| 4,238,085 | 12/1980 | Jansson et al. | 242/84.2 G |

Primary Examiner—John M. Jillions
Assistant Examiner—Joseph J. Hail, III

[57] ABSTRACT

An open face fishing reel 2 having a pivotally supported nonspinning bail 111 positioned such that fishing line 105 is always within reach of the index finger of the hand holding the rod. The nonspinning bail 111 is movable to a line casting position, disengaged from the line 105 and remote from the open end of a spool 94. Upon rotation of a hand crank 80 for line retrieval, bail 111 is smoothly and automatically tripped to pivot to a line retrieval position for line pick-up and winding.

The invention includes a line traversing cam encircling the spool. A means for driving the spool and the line cam to rotate produces a relatively high number of even-wound turns of line, per layer, upon the spool.

7 Claims, 5 Drawing Figures

OPEN FACE ROTATABLE SPOOL FISHING REEL

DESCRIPTION

This is a continuation-in-part of application Ser. No. 558,821 filed Dec. 7, 1983 now abandoned.

TECHNICAL FIELD

This invention relates to fishing reels and specifically to fishing reels having means for line pay-off along a direction parallel to the axis of rotation of a line spool. A means for line traversing during winding is also included.

BACKGROUND OF THE INVENTION

Fishing reels having substantially exposed open end spools are commonly called open face reels and line pay-off is along a direction parallel to the axis of rotation of the spool. Generally the devices are of the spinning reel type having a normally nonrotative spool wherein a line pick-up spins about the spool to wind the line. The reels have been widely used for reasons which include their longer distance casting capability when compared to typical closed face spinning reels.

A disadvantage of the winding method of open face reels is that the line held by the pick-up must always be repositioned to the top of the reel in order to cast. This is done, by way of the reel crank, so that the user can reach the line with the index finger of the hand holding the rod. The spinning line pick-up also increases the chance of tangling the line in leaves or branches that are close to the reel, especially when fishing at night.

Another disadvantage of typical state-of-the-art spinning reels, is the relatively low number of turns of line, per layer, upon their spools. During a cast, this results in somewhat disorderly peeling of the line which causes excessive line friction, thereby reducing the length of the cast.

The fishing reel invention disclosed herein has all the advantages of an open face, but has improvements provided by a compact level winding device. With a retrieve ratio of 5 to 1 (one turn of the hand crank producing five turns of the spool core), this invention will wind 12½ turns, per layer, upon the spool. With the same retrieve ratio, typical state-of-the-art spinning reels wind only 2½ turns, per layer, upon their spools. The advantage of a greater number of turns, per layer, is that fewer layers need to be payed-out with a cast, thus generating less line friction and less drag with the more orderly peeling of the line. The result being a cast of greater distance, with all other conditions being equal. Further, the spool of the invention will hold more line with the more orderly windings.

Another advantage of this invention over the open face spinning reels, is that it has a nonspinning line pick-up positioned such that the line is always within reach of the index finger of the hand holding the rod. This convenience eliminates the need, after each line retrieval, to reposition the line pick-up to a position adjacent the mentioned index finger in preparation for another cast. The convenience is especially desirable in poor lighting or at night. The nonspinning line pick-up also reduces the chance of line tangling by obviating the the circular spinning of the line which is vulnerable to leaves, branches, and other impeding obstacles.

SUMMARY OF THE INVENTION

The open face fishing reel disclosed herein has a nonspinning bail positioned such that the fishing line is always within reach of the index finger of the hand holding the rod. The nonspinning bail is movable to a line casting position, disengaged from the line and remote from the open end of the spool. Upon rotation of the hand crank for line retrieval, the bail is smoothly and automatically tripped to pivot to a line retrieval position for line pick-up and winding.

The invention includes a line traversing cam encircling the spool. A means for driving the spool and the line cam to rotate produces a relatively high number of even-wound turns of line, per layer, upon the spool. Thus, the orderly wound line generates low friction line pay-out for long distance casting.

BRIEF DESCRIPTION OF THE DRAWINGS

The accompanying drawings in combination with the description herewith, illustrate features and advantages of the invention. Like reference characters in different views refer to the same parts. The drawings are intended to illustrate principals of the invention and are not necessarily to scale and in which drawings.

DETAILED DESCRIPTION OF THE INVENTION

Figure 1:
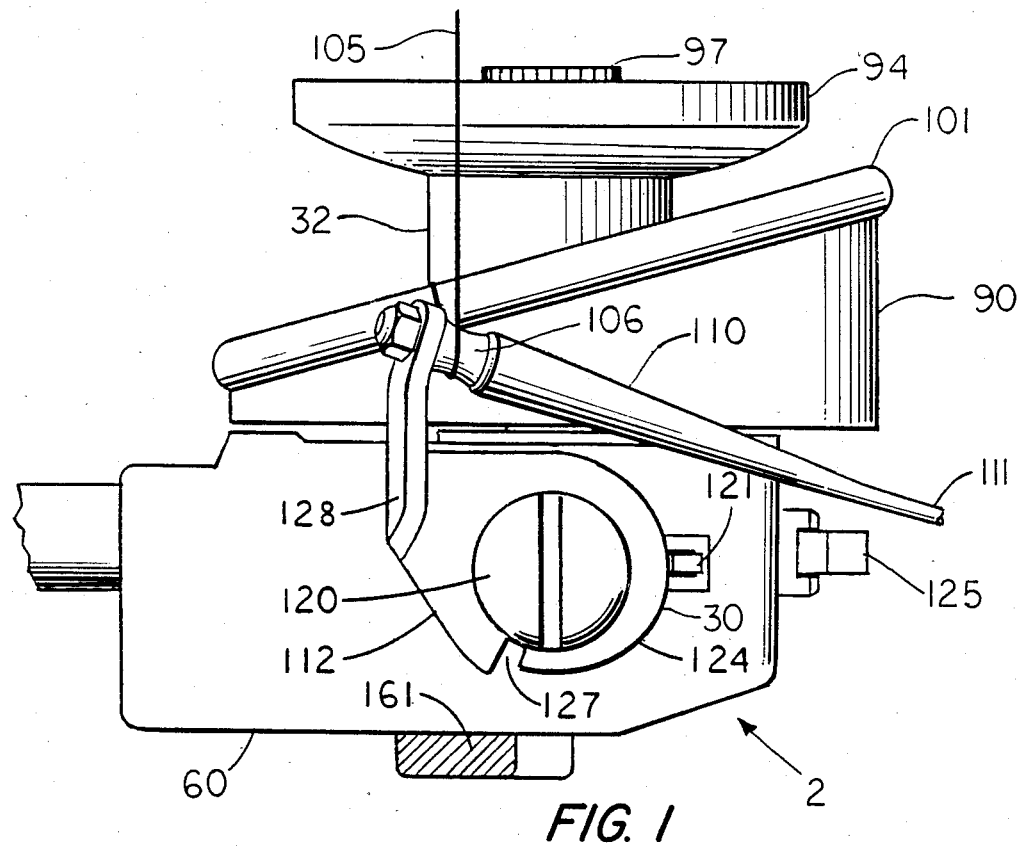
FIG. 1 is an auxiliary view of the invention showing the true shape of a face of the bail cam with the rotational axis of the bail imagined as perpendicular to the page, portions of the bail and hand crank are broken away and the mounting saddle removed.
Figure 2:
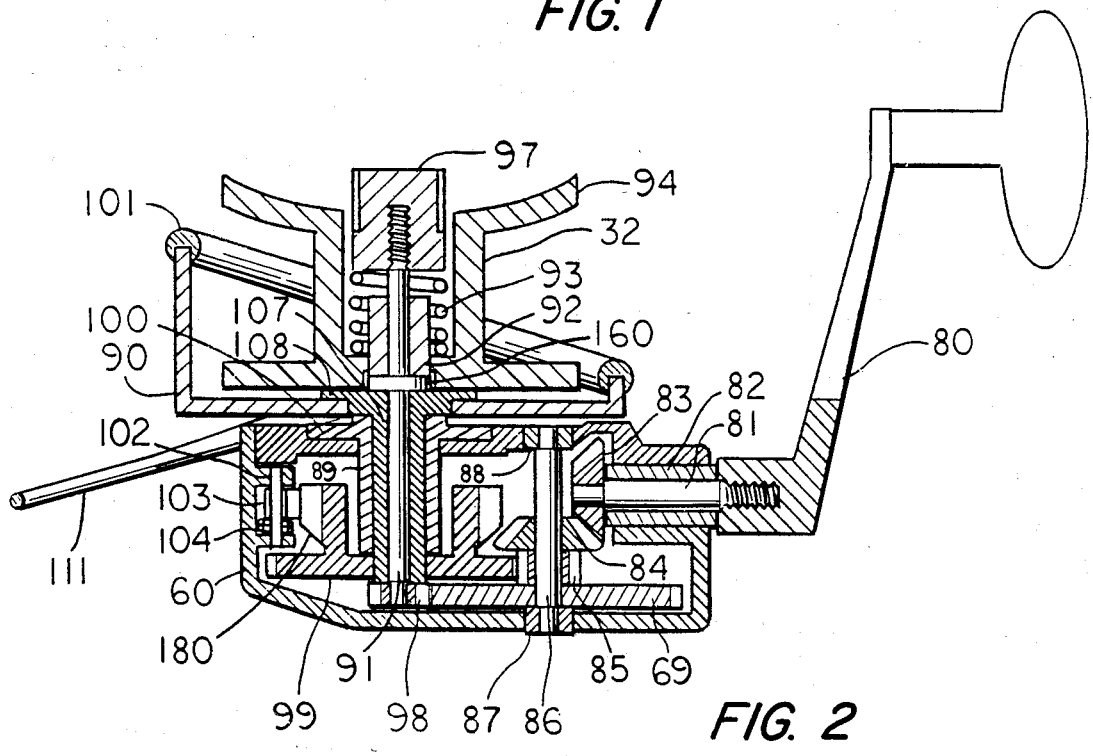
FIG. 2 is a cross-sectional view of the invention taken through the rotational axis of the spool.

An open face fishing reel is referenced generally by the numeral 2 in FIG. 1. A spool 94 having a hollow core 32 (FIG. 2) is provided with an internal bushing 92 coaxially fixed in an aperture in the spool hub. The spool 94 and bushing 92 are coaxially and rotatably mounted to a first portion of a spindle shaft 91. A second portion of the spindle shaft 91 is coaxially journaled in a first bearing 107. A first portion of bearing 107 is formed as a flange 108 to which a cylindrical support cup 90 is coaxially fixed.

The cylindrical support cup 90 serves to support an elliptically shaped rail 101 positioned such that its elliptical center is located at the midpoint of the spool core axis. The minor axis of the ellipse is perpendicular to the spool axis. The major axis of the ellipse is tilted at an oblique angle relative to the spool axis. The distance between a pair of lines normal to the spool axis, wherein one line intersects one vertex of the ellipse and the other line intersects the other vertex of the ellipse, is substantially the length of the spool core 32. Thus, the combination of the rail 101 and support cup 90 form a line traversing cam which encircles spool 94. The elliptical rail is constructed of a material that lends itself to produce low sliding friction (as many plastics and polished metals do) or it is coated with such a material.

Coaxially combined with shaft 91 is a flange 160 which prevents bushing 92 (and the spool) from contacting flange 108. Within the hollow core of the spool 94, a drag spring 93 encircles a portion of shaft 91. A knob 97, internally threaded to mate with a threaded portion of shaft 91, provides an adjustable means to compress the drag spring 93 between the knob 97 and the spool 94. Thus, an adjustable drag is formed to controllably limit the ability of the spool 94 to rotate independently of the rotation of shaft 91.

First bearing 107 has a second portion journaled in a second bearing 89. An end portion of bearing 89 is formed as a flange 100 which is fixed into an annular recess encircling an aperture in the wall of a housing 60. The main body of bearing 89 extends through the aperture into the housing 60. A third portion of spindle shaft 91 is coaxially fixed to a first gear 98. A third portion of first bearing 107 is coaxially fixed to a second gear 99 which is fixedly coaxially combined with a ratchet wheel 180. A hollow interior in the ratchet wheel 180 allows the wheel to encircle bearing 89 for efficient use of space within the housing 60. A crank 80 is coaxially fixed to an end portion of a first shaft 81. A bearing 82, supported by the housing, receives a journaled portion of shaft 81 for rotation therein. A first bevel gear 83 is coaxially fixed on an opposite end portion of shaft 81. Operatively engaged with bevel gear 83 is a second bevel gear 84 which is coaxially fixed to a first portion of a second shaft 86. A third gear 85 and a fourth gear 69 are coaxially fixed to a second portion and a third portion of shaft 86, respectively. Supported by the housing 60 are bearings 87 and 88 which receive respective end portions of shaft 86 for rotation therein. In mesh engagement with fourth gear 69 is first gear 98 and in mesh engagement with third gear 85 is second gear 99.

Shown in FIG. 1 is a cross section of a leg 161 that extends to a conventional rod mounting saddle (not shown). The saddle and a portion of the leg 161 are cut away to avoid obstructing details of the drawing.

The invention is disposed to retrieve fishing line when mounted, utilizing the mounting saddle, to the handle of an appropriate fishing rod (not shown). The open end of the spool should face the eyes of the rod. Line 105, passing from the rod eye nearest the reel, passes over a rotatable guide 106 (FIG. 1), then over the elliptical rail 101 to spool core 32.

The rotation of hand crank 80 drives the rotation of shaft 86 due to the engagement of bevel gears 83, 84. Consequently, the gears 85 and 69 drive the rotation of gears 99 and 98, respectively, which drive the rotation of support cup 90 (with rail 101), and spool 94, respectively. The preferred rotation rates are determined by standard gear speed formulae.

Fishing line 105, being wound on spool 94, is guided by guide 106 to contact and cross rail 101 as the line is drawn to spool core 32. As the line 105 is drawn over the rotating rail 101, it is guided by the angled rail to traverse spool core 32 to result in even winding.

The number of windings of fishing line in each successive layer on the spool core is determined by the gear tooth ratios that result in the relatively different rates at which the spool 94 and rail 101 are driven. The number of windings per layer is equal to the rotational rate of the spool divided by twice the rotational rate of the elliptical rail.

Figure 3:
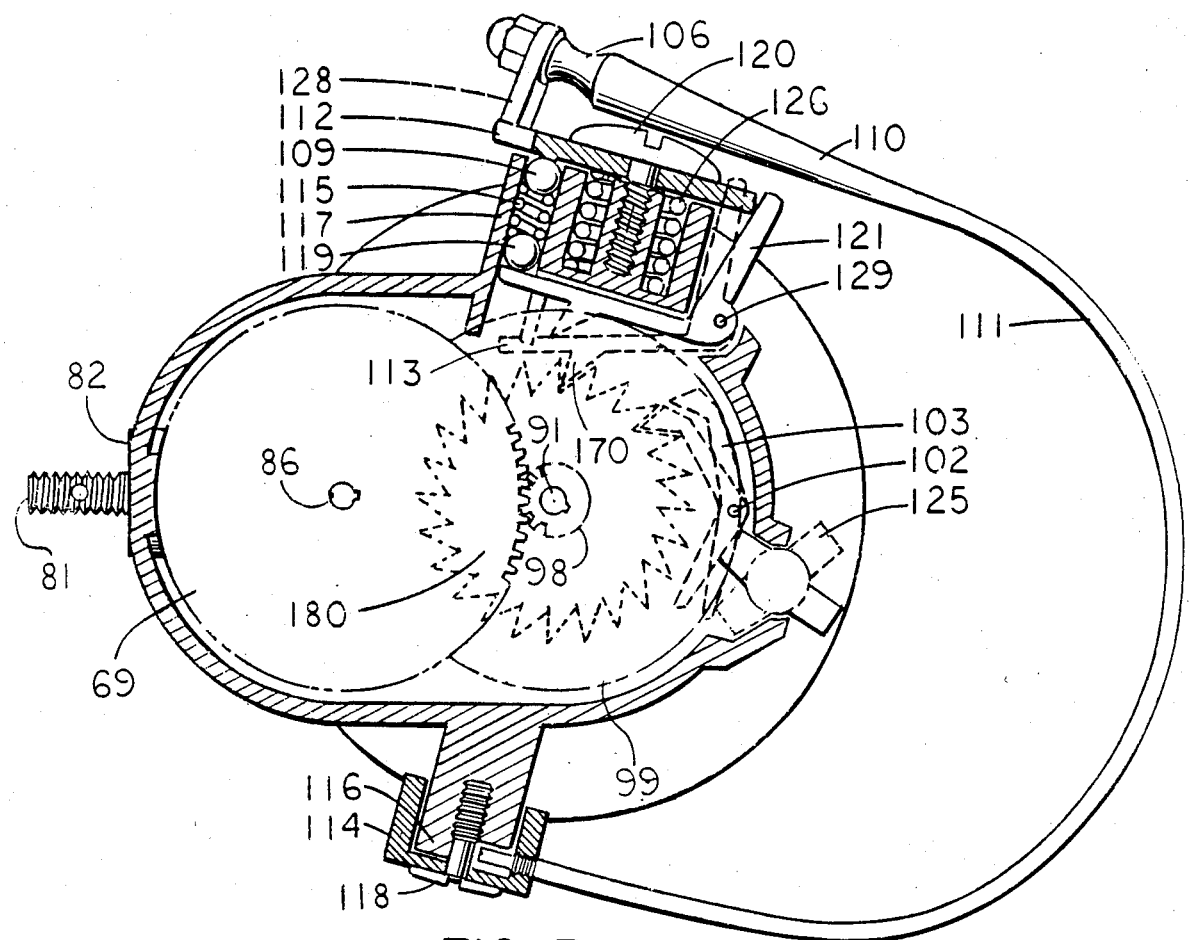
FIG. 3 is a cross-sectional view of the invention taken through the rotational axis of the bail system.
Figure 5:
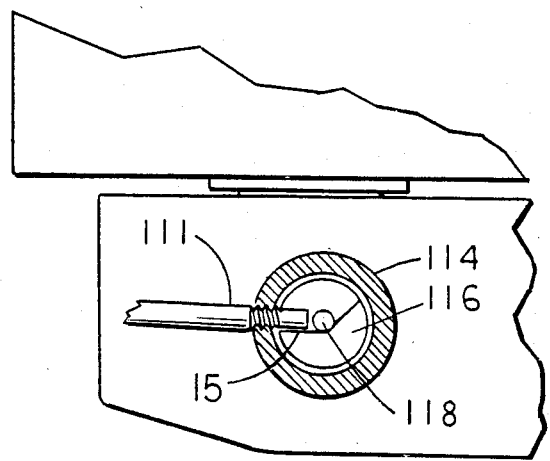
FIG. 5 is a partial view of the invention showing the bail pivot stop with the top of its housing cut away, the rotational axis of the bail being imagined as perpendicular to the page.

Guide 106 is a component of a line pick-up comprising a bail 111 which is substantially helically curved. Bail 111 is pivotally supported on housing 60. In a line retrieval position, the bail partially surrounds rail 101 and spool 94 (FIG. 1 and 3). A first end portion of bail 111 is closer to the open end of spool 94 than a second end portion of the bail. The bail first end portion is fixedly received into the apex of a narrow angled cone 110. Mounted at the base of cone 110 is guide 106. The rim of guide 106 is shaped to form an annular groove in which the line is guided during winding. A shaft extending from the cone base and threaded on one end, passes through the hub of guide 106 and is rigidly fastened to a lug extending from a bail cam 112. The threaded second end portion of the curved bail 111 is rigidly fastened to a hinge comprising a pivotally mounted housing 114 (FIG. 3 and 5) of a bail pivot stop 116. The stop 116 is formed from a cylindrical projection, extending from housing 60, having a wedge-shaped portion removed therefrom. An edge 15 of the wedge-shaped void defines a limit to which the second end portion of bail 111 can pivot, thereby establishing the line retrieval position of the line pick-up. The housing 114 pivots about a screw 118 which is coaxially received into stop 116.

Figure 4:
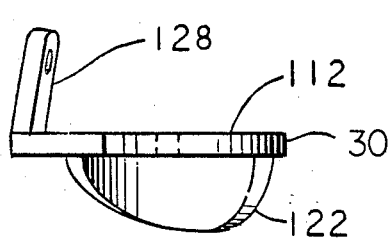
FIG. 4 is a side elevation view of the bail cam.

The bail cam 112 (FIG. 1, 3 and 4) pivots about a screw 120 and incorporates two cam lobes. A first cam lobe 122 (FIG. 4) extends perpendicularly from a face of a plate 30 and is configured as a portion of a right cylinder having an axis in common with the pivotal axis of bail cam 112. A second cam lobe 124 (FIG. 1) extends peripherally from plate 30. Screw 120 is received into a cylindrical projection (FIG. 3) extending from housing 60 diametrically opposite stop 116.

Encircling the pivotal axis of bail 111, beneath bail cam 112, is a torsion spring 126 (FIG. 3). One end of spring 126 is attached to bail cam 112 and an opposite end of the spring is attached to housing 60 such that bail 111 is urged toward the line retrieval position (FIG. 1). When the bail pivots to that position, the bail pivot stop 116 stops the bail which is then held by the stop and the pressure of spring 126.

In preparation for a cast, the user holds the line 105 with his index finger and pivots the bail to a line casting position, disengaged from the line and remote from the open end of the spool 94. As the bail is pivoted, the bail cam 112 pivots about its axis and the first cam lobe 122 compels an elastic cam follower comprising a first ball 109 (FIG. 3), a helical follower spring 115, and a second ball 119, to move linearly within a tubular guide 117. Slots (not shown), in the wall of guide 117, allow the transverse passage of first cam lobe 122. The moving elastic cam follower pivots a first pawl 113 which is pivotally mounted to housing 60 with a pivot pin 129. A slot (not shown) in the wall of guide 117 allows a distal portion of pawl 113 to move longitudinally within the guide. Simultaneously, the pawl tooth 170 engages ratchet wheel 180. As the bail reaches the line casting position, a distal portion of an arm 121, having a fulcrum portion in common with a fulcrum portion of pawl 113, slides into a notch 127 (FIG. 1) in second cam lobe 124. This locks the bail in the line casting position.

The elastic cam follower cooperates with the other components involved in the bail operation described above as follows: Ball 109 is seated to revolve in an end portion of spring 115, and ball 119 is seated to revolve in an opposite end portion of the spring. The spring 115 is elastically compressible along the direction between its first and second end portions. Ball 109 is engaged with cam lobe 122, and ball 119 is engaged with the distal portion of pawl 113. Spring 115 compresses as bail 111 pivots until notch 127 aligns with arm 121 to receive the same.

After the user completes his cast, he rotates hand crank 80 forward. This rotates ratchet wheel 180 forward to disengage pawl 113 from the ratchet wheel and arm 121 from bail cam 112. Thus, bail 111 is released. As spring 126 compels bail 111 and bail cam 112 toward the line retrieval position, cam lobe 124 moves arm 121 further to clear pawl 113 and tooth 170 away from ratchet wheel 180. Simultaneously, pawl 113 moves ball 119, spring 115, and ball 109 back to their original position. With ball 111 in the line retrieval position, the fishing line is entrapped. The helical configuration of bail 111 allows the fishing line to slide toward and into guide 106 as the line is tensioned by winding on spool 94. The portions of spool 94 and rail 101 encircled by bail 111 rotate toward guide 106 during winding.

The preceding description is given to illustrate the invention and not to limit the same. It is understood that various modifications may be made without departing from the spirit of the invention as claimed.

I claim:

1. A fishing reel comprising:
   a spool positioned with an open end such that line wound upon the spool can pay-off longitudinally of the spool axis during a line cast;
   a line traversing cam, encircling the spool, comprising a support cup and an endless rail of substantially elliptical circuit configuration fixedly mounted to the support cup at an oblique angle relative to the spool;
   a stationary housing;
   means for rotatably mounting the spool and the line cam to the housing about a common axis;
   a hand crank rotatably supported by the housing;
   means for drivingly connecting the crank with the spool and the line cam such that rotation of the crank compels the spool and the line cam to rotate such that the rotation rate of the spool is greater than the rotation rate of the line cam; and
   a line pick-up mounted to the housing, adjacent the line cam, the line pick-up being movable between a line engaged retrieval position and a line disengaged casting position.

2. A fishing reel as defined in claim 1, wherein the line pick-up comprises:
   a nonspinning bail pivotally supported by the housing, wherein the bail engages the line in the line retrieval position and is disengaged from the line in the line casting position;
   a spring for urging the bail to pivot from the line casting position to the line retrieval position;
   means for holding the bail in the line casting position; and
   means for releasing the bail, by rotation of the crank, to pivot the bail to the line retrieval position.

3. The fishing reel as defined in claim 1, wherein the means for drivingly connecting the crank with the spool, and the line cam, comprises:
   a first gear fixedly connected to the spool;
   a second gear fixedly connected to the line cam;
   a first shaft rotatably supported by the housing and coaxially fixed to the crank;
   a first bevel gear fixed to the first shaft;
   a second shaft rotatably supported by the housing;
   a second bevel gear fixed to the second shaft and in mesh engagement with the first bevel gear;
   a third gear fixed to the second shaft and in mesh engagement with the second gear; and
   a fourth gear fixed to the second shaft and in mesh engagement with the first gear.

4. A fishing reel comprising:
   a stationary housing;
   a spool rotatably supported by the housing, the spool having an open end such that line wound upon the spool can pay-off longitudinally of the spool axis during a line cast;
   a hand crank rotatably supported by the housing;
   means for drivingly connecting the crank with the spool such that rotation of the crank compels the spool to rotate;
   a nonspinning line pick-up pivotally supported by the housing, the pick-up being movable between a line engaged retrieval position and a line disengaged casting position;
   a spring for urging the line pick-up to pivot from the line casting position to the line retrieval position;
   a bail cam pivotally supported by the housing and fixedly connected to the line pick-up, the bail cam comprising a first cam lobe which is configured as a portion of a cylinder having an axis in common with the pivotal axis of the bail cam and extends perpendicularly from a face of a plate, and a second cam lobe which extends peripherally from the plate and is provided with a notch in a circumferential edge;
   a first pawl pivotally mounted within the housing;
   a cam follower operatively connecting the first cam lobe with the first pawl;
   an arm fixed to the first pawl, the arm being engageable in the second cam lobe notch for releasably locking the line pick-up in the line casting position;
   means for operatively connecting the hand crank with the first pawl such that rotation of the crank pivots the first pawl and the arm to release the line pick-up to pivot to the line retrieval position; and
   means, cooperative with the line pick-up, for even-winding line upon the spool.

5. The fishing reel as defined in claim 4, wherein the cam follower comprises:
   a follower spring;
   a first ball seated to revolve in a first end of the follower spring and to engage the first cam lobe; and
   a second ball seated to revolve in a second end of the follower spring and to engage the first pawl.

6. The fishing reel as defined in claim 4, wherein the means for operatively connecting the hand crank with the first pawl comprises:
   a ratchet wheel rotatably mounted within the housing, the ratchet wheel being engageable with the first pawl;
   means for drivingly connecting the hand crank with the ratchet wheel such that rotation of the crank compels the ratchet wheel to rotate so that the ratchet wheel pivots and disengages the first pawl and the arm to release the line pick-up to pivot to the line retrieval position as the second cam lobe, engaged with the arm, further pivots the arm and the first pawl to clear the first pawl away from the ratchet wheel.

7. The fishing reel as defined in claim 6, further comprising:
   a second pawl pivotally supported within the housing and engageable with the ratchet wheel;
   a spring urging the second pawl to engage the ratchet wheel;
   a lever-switch pivotally supported by the housing and engageable with the second pawl to pivot the second pawl out of engagement with the ratchet wheel when the lever-switch is moved to an OFF position.

* * * * *